United States Patent
Yang

(10) Patent No.: US 12,020,055 B2
(45) Date of Patent: Jun. 25, 2024

(54) VNF SERVICE INSTANTIATION METHOD AND APPARATUS

(71) Applicant: HUAWEI TECHNOLOGIES CO., LTD., Guangdong (CN)

(72) Inventor: Xu Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 442 days.

(21) Appl. No.: 17/356,874

(22) Filed: Jun. 24, 2021

(65) Prior Publication Data

US 2021/0326167 A1    Oct. 21, 2021

Related U.S. Application Data

(63) Continuation of application No. PCT/CN2019/129578, filed on Dec. 28, 2019.

(30) Foreign Application Priority Data

Dec. 28, 2018    (CN) .......................... 201811624936.6

(51) Int. Cl.
   G06F 9/54    (2006.01)
   G06F 9/455   (2018.01)
   G06F 9/50    (2006.01)

(52) U.S. Cl.
   CPC ........ *G06F 9/45558* (2013.01); *G06F 9/5033* (2013.01); *G06F 9/5077* (2013.01); (Continued)

(58) Field of Classification Search
   CPC ....... G06F 9/5061; G06F 9/5077; G06F 9/546
   See application file for complete search history.

(56) References Cited

U.S. PATENT DOCUMENTS 10,931,525 B2 * 2/2021 Lovene ............... H04L 41/0897
11,349,708 B2 * 5/2022 Chakrapani Rangarajan ...............
                                                    H04L 41/5045
(Continued)

FOREIGN PATENT DOCUMENTS

CN    105550130 A    5/2016
CN    105812171 A    7/2016
(Continued)

OTHER PUBLICATIONS

Ye Tao et al., "Dynamic Resource Allocation Algorithm for Container-based Service Computing",2017 IEEE 13th International Symposium on Autonomous Decentralized Systems, total 7 pages.

*Primary Examiner* — Andy Ho
(74) *Attorney, Agent, or Firm* — HUAWEI TECHNOLOGIES CO., LTD.

(57) ABSTRACT

This application discloses a VNF service instantiation method and apparatus. The method is performed by a network functions virtualization orchestrator NFVO or a virtualized network function manager VNFM. The method includes: receiving a virtualized network function VNF instantiation request message; obtaining deployment information of a container service instance that needs to be invoked for VNF instantiation; determining one or more container as service clusters CaaS clusters based on the deployment information of the container service instance, and sending a container service instance creation request to a container as service manager CaaS manager in each of the one or more CaaS clusters; and receiving a container service instance creation success message from the CaaS manager. According to the foregoing solution, problems of cross-site deployment and management of a container service in an NFV scenario are resolved.

20 Claims, 7 Drawing Sheets

(52) U.S. Cl.
CPC ............ *G06F 2009/45562* (2013.01); *G06F 2009/4557* (2013.01); *G06F 2009/45595* (2013.01); *G06F 2209/503* (2013.01); *G06F 2209/505* (2013.01)

(56) References Cited

U.S. PATENT DOCUMENTS

| | | |
|---|---|---|
| 2016/0212016 A1 | 7/2016 | Vrzic et al. |
| 2017/0257432 A1 | 9/2017 | Fu et al. |
| 2018/0132138 A1 | 5/2018 | Senarath et al. |
| 2018/0239647 A1 | 8/2018 | Tsai et al. |
| 2020/0012510 A1* | 1/2020 | Andrianov .......... G06F 9/45558 |

FOREIGN PATENT DOCUMENTS

| | | |
|---|---|---|
| CN | 106161603 A | 11/2016 |
| CN | 107426109 A | 12/2017 |
| CN | 108304250 A | 7/2018 |
| CN | 108400998 A | 8/2018 |
| CN | 108702316 A | 10/2018 |
| WO | 2017157156 A1 | 9/2017 |
| WO | 2018174897 A1 | 9/2018 |

\* cited by examiner

VNF SERVICE INSTANTIATION METHOD AND APPARATUS

CROSS-REFERENCE TO RELATED APPLICATIONS

This application is a continuation of International Application No. PCT/CN2019/129578, filed on Dec. 28, 2019, which claims priority to Chinese Patent Application No. 201811624936.6, filed on Dec. 28, 2018, The disclosures of the aforementioned applications are hereby incorporated by reference in their entireties.

TECHNICAL FIELD

This application relates to the field of cloud computing technologies, and in particular, to a virtual network function (Virtual Network Function, VNF) service instantiation method and apparatus.

BACKGROUND

A network functions virtualization (Network Functions Virtualization, NFV) technology can be simply understood as moving functions of network elements used in a telecommunications network from a current dedicated hardware platform to a universal commercial off-the-shelf (COTS, Commercial-off-the-shelf) product server. The NFV technology converts the network elements used in the telecommunications network into independent applications, and the independent applications may be flexibly deployed on a uniform infrastructure platform constructed based on other devices such as a standard server, memory, and switch. Resource pooling and virtualization are performed on an infrastructure hardware device by using a virtualization technology, to provide a virtual resource for an upper-layer application and decouple the application from hardware, so that a virtual resource can be quickly added for each application to quickly increase a system capacity, or a virtual resource can be quickly reduced to decrease a system capacity. This greatly improves network flexibility. With a shared resource pool constituted by general COTS servers, no hardware device needs to be independently deployed for a newly developed service. Therefore, it significantly shortens time to market of the new service.

The NFV technology is based on a cloud computing technology and a virtualization technology. Hardware devices such as general COTS computing/storage/network hardware devices may be decomposed into various virtual resources by using the virtualization technology, for use by various upper-layer applications. The virtualization technology implements decoupling between an application and hardware, so that a virtual resource supplying speed is greatly increased. The cloud computing technology can implement auto scaling of applications, and implement a match between a virtual resource and service load. This not only increases utilization of the virtual resource, but also increases a system response rate.

Virtualized telecom network functions gradually evolve into containers. Container as a service (CaaS) is a specific type of platform as a service (Platform as a Service, PaaS) service. A container is an operating system-level virtualization technology. The container isolates different processes by using operating system isolation technologies, such as CGroup and NameSpace in Linux. A difference from a hardware virtualization technology lies in that, the container technology does not specially virtualize hardware, there is no independent operating system in a container, and resource sharing is implemented only through process isolation and resource usage restriction. By virtue of this important feature of the container technology, a container is more lightweight and easier to manage in comparison with a virtual machine. In a running state of a container, a group of common management operations are defined, such as starting, stopping, pausing, and deleting the container, to manage a lifecycle of the container.

Telecom services have high reliability requirements, and remote geographic redundancy is a common requirement. Network elements are provided by a plurality of vendors and may run on their own container management platforms. Currently, IoT and edge computing also have requirements on edge cloud deployment. One central data center and a plurality of edge clouds are a common deployment solution. In addition, a current mainstream container orchestration tool (such as K8S) can manage only a limited quantity of nodes. For example, the latest K8S version can manage a maximum of 5000 nodes. Due to the foregoing factors, deployment and management of a multi-container service site (CaaS Cluster) become a basic requirement in an NFV service scenario.

However, current standards and solutions are not mature to support the deployment and management of a multi-container service site. In existing standards, a solution in which an NFV management platform manages a container is still under discussion, and no mature solution is available. The K8S does not have a specific solution to a scenario of hybrid orchestration of a virtual machine and a container.

SUMMARY

Embodiments of the present disclosure provide a VNF service instantiation method, apparatus, and system. In comparison with the conventional technology, a procedure and an interface of a multi-container service site in an NFV system are clearly described.

An embodiment of the present disclosure provides a virtualized network function VNF instantiation method. The method is performed by a network functions virtualization orchestrator NFVO or a virtualized network function manager VNFM, and includes:

receiving a virtualized network function VNF instantiation request message;
 obtaining deployment information of a container service instance that needs to be invoked for VNF instantiation;
 determining one or more container as service sites CaaS cluster based on the deployment information of the container service instance, and sending a container service instance creation request to a container as service manager CaaS manager in each of the one or more CaaS clusters; and
 receiving a container service instance creation success message from the CaaS manager.

The VNFM obtains a corresponding VNFD from a database based on the VNF instantiation request message, and obtains the deployment information of the corresponding container service instance from the VNFD.

The deployment information of the container service instance includes one or more of the following:
 a name of a specified cluster, or
 an affinity/anti-affinity rule, or
 a deployment weight of each CaaS cluster or a quantity or a quota of container service instances that are deployed in each CaaS cluster, when a plurality of container CaaS clusters are deployed.

If a selected CaaS cluster does not have sufficient resources, a physical server or a virtual machine resource is applied for from a virtualized infrastructure manager VIM, to add a resource to the selected CaaS cluster.

An embodiment of the present disclosure provides a virtualized network function VNF instantiation apparatus, including:
- a receiving unit, configured to receive a virtualized network function VNF instantiation request message;
- a processing unit, configured to: obtain deployment information of a container service instance that needs to be invoked for VNF instantiation, and determine one or more container as service sites CaaS cluster based on the deployment information of the container service instance; and
- a sending unit, configured to send a container service instance creation request to a container as service manager CaaS manager in each of the one or more CaaS clusters; where
- the receiving unit is further configured to receive a container service instance creation success message from the CaaS manager.

An embodiment of the present disclosure provides a virtualized network function VNF instantiation system, including a virtualized network function VNF service instantiation apparatus and one or more container as service managers CaaS managers, where
- the VNF service instantiation apparatus is configured to: receive a VNF instantiation request message; obtain deployment information of a container service instance that needs to be invoked for VNF instantiation; determine one or more CaaS clusters based on the deployment information of the container service instance, and send a container service instance creation request to a container as service manager CaaS manager in each of the one or more CaaS clusters; and receive a container service instance creation success message from the CaaS manager; and
- the CaaS manager is configured to: receive the container service instance creation request, create the corresponding container service instance, and send the container service instance creation success message to the VNF service instantiation apparatus.

An embodiment of the present disclosure further provides a virtualized network function VNF service instantiation apparatus, where the apparatus includes a processor and a memory. The memory is configured to store a program for performing the foregoing method, and store data used in the foregoing method. The processor is configured to execute the program stored in the memory.

An embodiment of the present disclosure further provides a computer-readable storage medium. The computer-readable storage medium stores executable program instructions. When the executable program instructions are run, the executable program instructions are used to perform the steps in the foregoing method.

An embodiment of the present disclosure further provides a computer program product. When the computer product is executed, the computer product is used to perform the steps of the foregoing method.

The foregoing embodiments are provided for a scenario of one or more CaaS clusters in a MANO architecture. According to the foregoing solutions, problems of cross-site deployment and management of a container service in an NFV scenario are resolved, so that a container service of a VNF can be deployed in different CaaS clusters, and a MANO system can control and manage one or more CaaS clusters.

DESCRIPTION OF EMBODIMENTS

To make the objectives, technical solutions, and advantages of this application clearer, the following further describes implementations of this application in detail with reference to the accompanying drawings.

Before the embodiments of this application are further described in detail, an application scenario of the embodiments of this application is first described.

Figure 1:
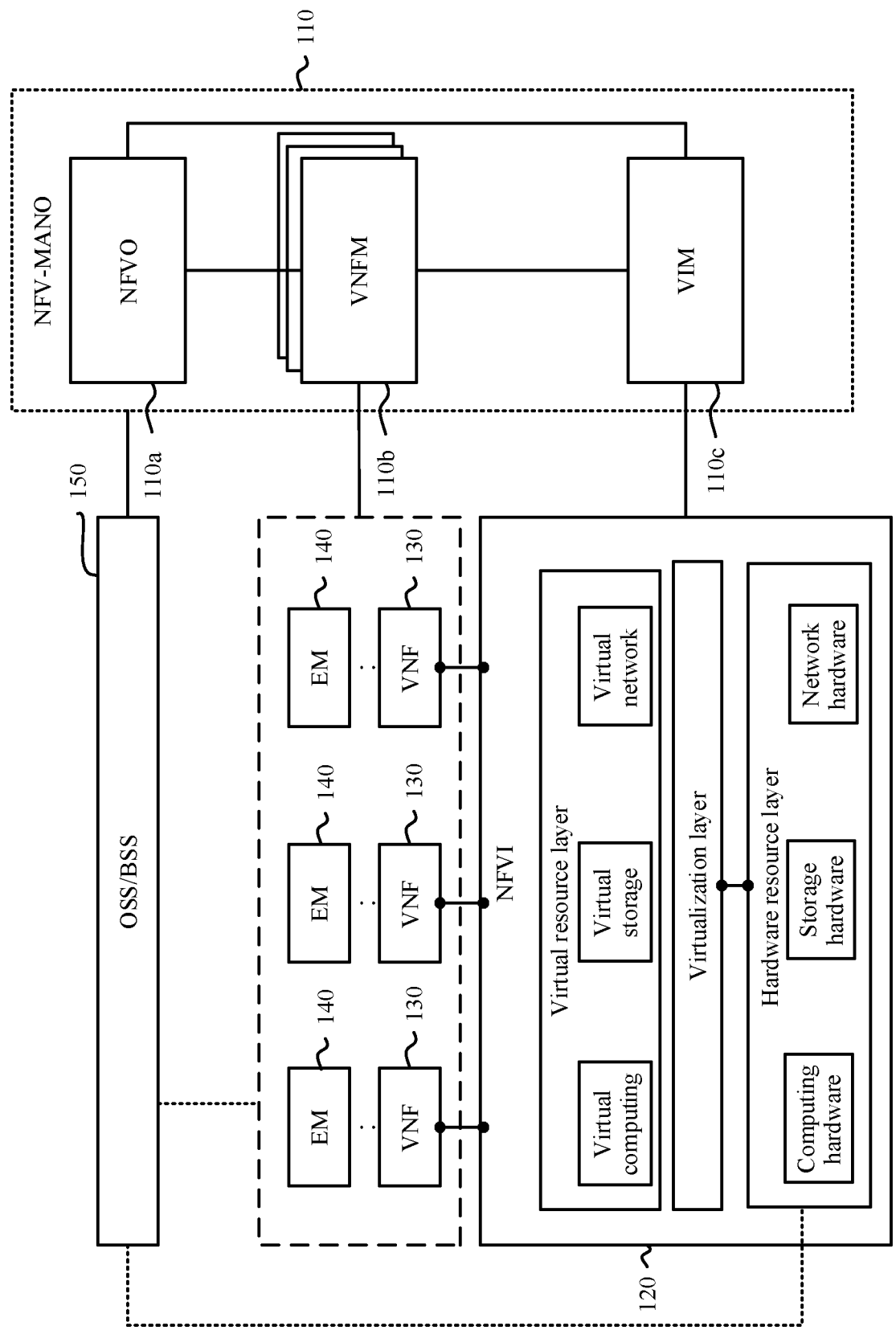
FIG. 1 is a schematic diagram of an NFV architecture according to an embodiment of the present disclosure.

Because a container manager (CaaS Manager) in the embodiments of this application is deployed in an NFV architecture, the NFV architecture is first described herein. FIG. 1 is a schematic diagram of an NFV architecture according to an embodiment of this application. The NFV system architecture can be applied to various types of networks, for example, an operator's communications network or a local area network.

As shown in FIG. 1, the NFV architecture mainly includes a MANO entity 110, an NFVI 120, a plurality of VNFs 130, a plurality of element management (Element Management, EM) 140, an operation support system/business support system (Operation Support System/Business Support System, OSS/BSS) 150, and the like. The MANO entity 110 further includes a network functions virtualization orchestrator (NFV Orchestrator, NFVO) 110a, one or more virtualized network function managers (Virtualized Network Function Manager, VNFM) 110b, and a virtualized infrastructure manager (Virtualized Infrastructure Manager, VIM) 110c.

For ease of subsequent description, the following describes functions of the modules in the NFV architecture in FIG. 1.

The NFVO 110a is configured to: manage and process a network service descriptor (Network Service Descriptors, NSD) and a virtualized network function forwarding graph (VNF Forwarding Graph, VNFFG), manage a lifecycle of a network service, and cooperate with the VNFM to implement lifecycle management of a VNF and a global view function of a virtual resource.

The VNFM 110b is configured to implement VNF lifecycle management, including management of a virtualized network function descriptor (VNF Descriptor, VNFD) file, VNF instantiation, VNF instance auto scaling (including scaling out/up and scaling in/down), VNF instance healing (Healing), and VNF instance termination. The VNFM further supports receiving of an auto scaling (Scaling) policy delivered by the NFVO or defined in a VNFD, to implement auto scaling of the VNF.

The VIM 110b is responsible for managing (including reserving and allocating) a hardware resource and a virtual resource at an infrastructure layer, monitoring a status of the virtual resource and reporting a fault, and providing a virtual resource pool for an upper-layer application.

The OSS/BSS 150 refers to an existing operator's operation and maintenance system OSS/BSS.

The EM 140 is configured to perform conventional fault management, configuration management, account management, performance management, and security management (Fault Management, Configuration Management, Account Management, Performance Management, Security Management, FCAPS) functions for the VNF 130.

The VNF 130 corresponds to a physical network function (Physical Network Function, PNF) in a conventional non-virtualized network, for example, a virtualized 4G core network (Evolved Packet Core, EPC) EPC node, such as a mobility management entity (Mobility Management Entity, MME), a serving gateway (Serving Gateway, SGW), or a packet data network gateway (Packet Data Network Gateway, PGW). Functional behavior and a status of a network function are unrelated to virtualization of the network function. NFV technologies require that the VNF and the PNF have same functional behavior and a same external interface.

In addition, the VNF 130 may include a plurality of VNF components (VNF Component, VNFC). Therefore, in actual application, one VNF 130 may be deployed on a plurality of virtual machines (Virtual Machine, VM), and each VM hosts a function of one VNF component. Certainly, one VNF 130 may alternatively be deployed on one VM.

The NFVI 120 includes a hardware resource, a virtual resource, and a virtualization layer. From a perspective of the VNF 130, the virtualization layer and the hardware resource seem to be a complete entity that can provide a required virtual resource.

Figure 2:
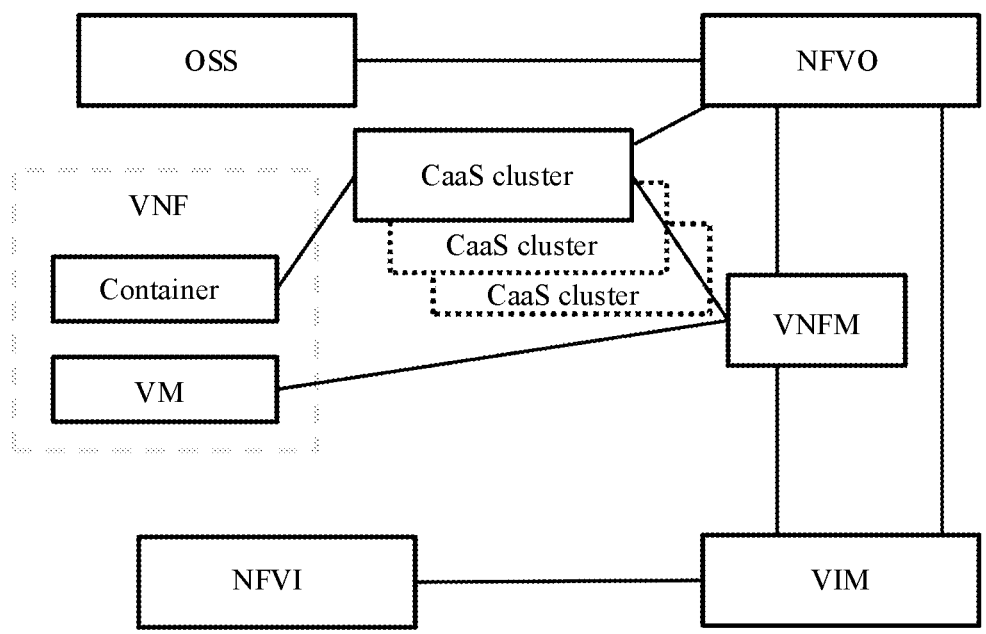
FIG. 2 is a schematic diagram of an NFV architecture in which a CaaS cluster is deployed according to an embodiment of the present disclosure.

FIG. 2 is a schematic diagram of an NFV architecture in which one or more container as service sites (CaaS Cluster) are deployed according to an embodiment of this application.

One or more CaaS clusters are connected to an NFVO and/or a VNFM in a MANO system. Each CaaS cluster is deployed with one CaaS manager. A CaaS manager instantiates a container service in a CaaS cluster in which the CaaS manager is located, and manages and schedules a container service instance. The NFVO or the VNFM may obtain container resource status information in each CaaS cluster and send a container service request to the CaaS cluster after the NFVO or the VNFM is connected to the CaaS manager in each CaaS cluster.

A VNFD field of a VNF described in the conventional technology mainly includes parameters such as deployment flavour and VduProfile in the deployment flavour. The deployment flavour is used to describe a specific deployment solution for VNF deployment. The solution includes various deployment requirements, such as virtual resource specifications (such as a quantity of CPUs and a memory size of a virtual machine and a quantity of CPUs of containers) required for deployment, a lifecycle management operation supported by the VNF, an affinity/anti-affinity relationship between components, a supported monitoring indicator, and a scaling out/in parameter. VduProfile is used to describe specification information and a deployment quantity of virtual machines/containers. Functions of the foregoing parameters have been described in an existing standard. Details are not described herein.

However, during actual deployment in the embodiments of the present disclosure, deployment information of a container service instance needs to be added to the VNFD field that describes the VNF in the conventional technology. The deployment information may include but is not limited to the following types of information:

1. Deployment location information of the container service instance

For example, one or more CaaS clusters in which the container service instance is specifically deployed may be identified by a name, an ID, or a label of the one or more CaaS clusters.

2. Affinity/anti-affinity rule

If a VNF is divided into two parts that work in an active/standby mode, anti-affinity deployment is required between two CaaS clusters, that is, one part is deployed in each CaaS cluster.

3. Deployment weight of each CaaS cluster (instances are deployed based on a weight proportion), or a quantity or a quota of container service instances that are deployed in each CaaS cluster The deployment weight is used to indicate the VNFM to allocate, based on a defined weight proportion, a container service instance that needs to be deployed to each CaaS cluster. For example, specific container service instances need to be deployed in a cluster A, a cluster B, and a cluster C, and deployment weights of the cluster A, the cluster B, and the cluster C are 6, 3, and 1, respectively. In this case, 60% (6/(6+3+1)) of the container service instances are deployed in the cluster A, and 30% and 10% of the container service instances are deployed in the cluster B and the cluster C, respectively. The quantity of container service instances is used to directly specify a quantity of instances that need to be deployed in each CaaS cluster. For example, it is specified that 2, 3, and 5 container service instances are deployed in the clusters A, B, and C, respectively. The quota is used to specify a maximum quantity of container service instances that can be deployed in each CaaS cluster. For example, a maximum of 10, 15, and 5 container service instances can be deployed in the clusters A, B, and C, respectively. During initial deployment and subsequent lifecycle management (such as scaling out), a quantity of container service instances deployed in each CaaS cluster cannot exceed the quantity specified by the quota.

That the deployment information of the container service instance is added to the VNFD field may be implemented in two manners:

(1) A dedicated field is added to describe the deployment information of the container service instance.

(2) An existing virtualization deployment unit (Virtualization Deployment Unit, VDU) field in the VNFD is reused and added. The virtualization deployment unit field is used to describe a resource requirement of a virtual machine in an existing standard. The field is reused to describe a resource requirement of a container, and a deployment requirement for a CaaS cluster is added to the field.

For a specific implementation of the foregoing manner (1), refer to the following manner:

| Adding content to the VNFD | Description |
| --- | --- |
| ContainerProfile | Container deployment requirement |
| Cluster_selector | CaaS cluster characteristic (information such as a name, an ID, or a label of a cluster may be described in a form of Key Value Pair.) |
| Cluster_number | Quantity of clusters in which deployment is performed |
| localAffinityOrAntiAffinityRule | Affinity/anti-affinity rule between a plurality of instances generated based on a same container template |
| affinityOrAntiAffinityGroupID | Affinity/anti-affinity deployment rules for different parts of a VNF |

For an affinity/anti-affinity rule in a container deployment scenario, refer to the following manner:

| Local Affinity Or Anti-Affinity Rule Affinity Or Anti-Affinity Group | Description |
| --- | --- |
| scope | A current value includes NFVI-PoP (site), Zone (zone), Zone Group (zone group), or NFVI-Node (physical server). In a multi-container site scenario, a container cluster may be added, and affinity/anti-affinity rules may be set for different container domains. |
| weight | A weight field is added to set deployment weights of different clusters. |

For the foregoing manner (2), refer to the following manner:

| Reusing and adding fields in the VNFD | Description |
| --- | --- |
| VduProfile | VDU deployment requirement, used to describe a container deployment requirement (currently used to describe a virtual machine deployment requirement) |
| Type | Attribute added to distinguish between a container and a virtual machine |
| Cluster_selector | CaaS cluster characteristic (information such as a name, an ID, or a label of a cluster may be described in a form of Key Value Pair.) |
| Cluster_number | Quantity of CaaS clusters in which deployment is performed |

For an affinity/anti-affinity rule, refer to the manner (1).

After receiving a virtualized network function VNF instantiation request message and before sending a service request to a CaaS manager, the NFVO or the VNFM needs to first obtain a corresponding VNFD from a database, and obtain deployment information of a container service instance from the VNFD; then selects a proper CaaS cluster based on information about a locally deployed CaaS cluster, including information such as a quantity and a processing capability (the foregoing information may be obtained in advance through query or based on external configuration); and sends the service request to a CaaS manager of a CaaS cluster that meets a condition. The service request includes container creation, update, query, deletion, and the like.

In addition to initiating the service request to the CaaS manager, the NFVO or the VNFM further needs to maintain a status of each CaaS cluster. That is, the NFVO or the VNFM periodically queries a status of a current VNF instance from a CaaS manager of each CaaS cluster. If the status is inconsistent with a status described in the VNFD, the NFVO or the VNFM triggers a corresponding service request, to create/delete/update a container, so that an actual status is consistent with the status described in the VNFD. In addition, the NFVO or the VNFM can further provide a DNS and a load balancing service between different CaaS clusters, so that VNFs deployed across sites can perform inter-site service communication smoothly.

The following further describes the technical solutions of the present disclosure by using several specific embodiments.

Figure 3:
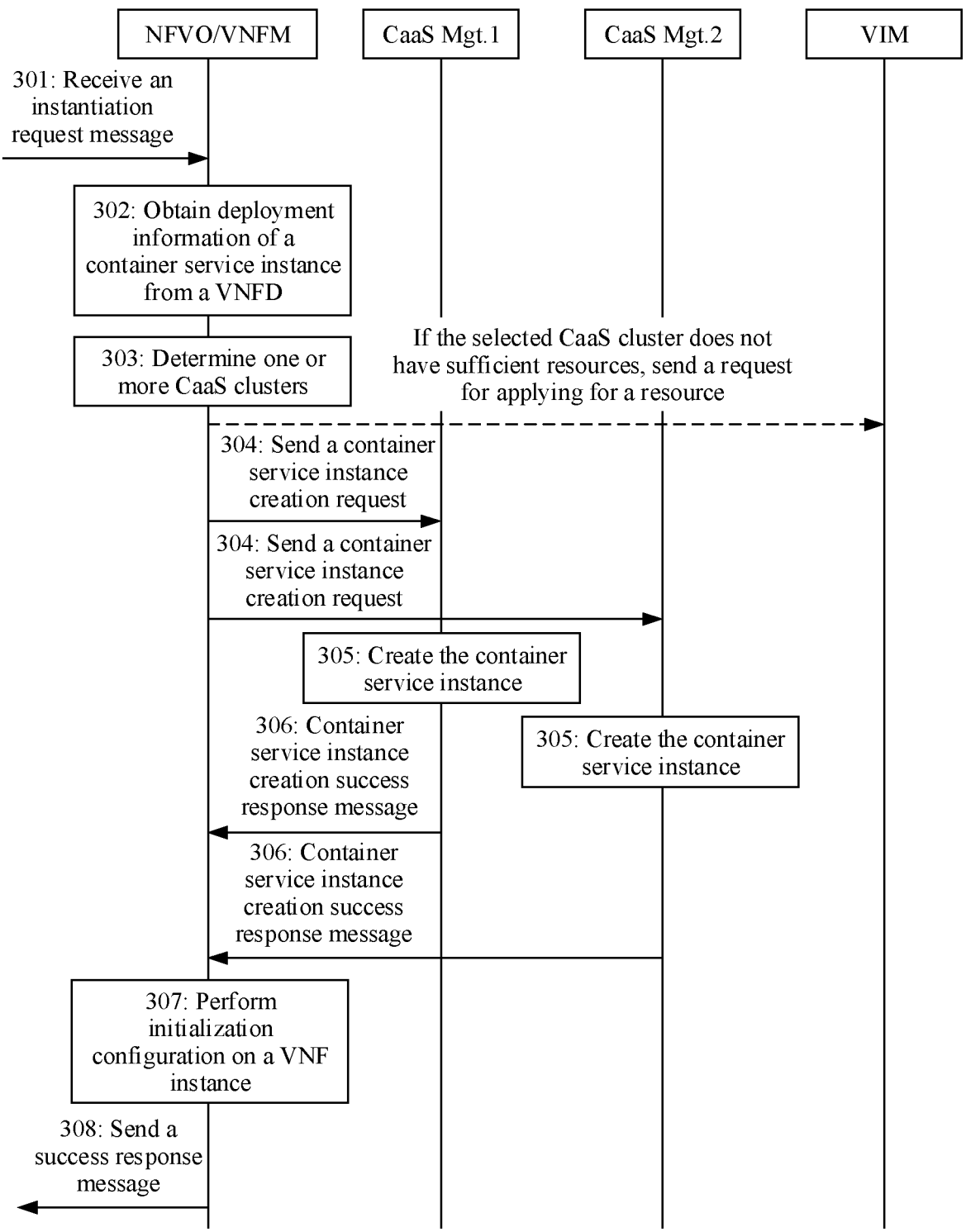
FIG. 3 is a schematic flowchart of VNF instantiation according to an embodiment of the present disclosure.

FIG. 3 is a flowchart of VNF instantiation. The VNF instantiation specifically includes instantiation of a container service instance and corresponding initialization configuration of a VNF instance. Steps are specifically as follows.

301: A VNFM receives a VNF instantiation request message from a sender, where the sender may be an NFVO or an EM; or an NFVO needs to perform VNF instantiation in a process of processing a network service (Network Service, NS) instantiation request; or an NFVO receives a granting (Granting) request that is initiated by a VNFM to request to authorize VNF instantiation.

302: The NFVO or the VNFM obtains deployment information of a container service instance from a VNFD corresponding to a VNF that needs to be instantiated. As described above, the deployment information of the container service instance may include: deployment location information of the container service instance; an affinity/anti-affinity rule; or a deployment weight (an instance is deployed based on a weight proportion) of a CaaS cluster, a quantity, or a quota.

303: The NFVO or the VNFM determines one or more container as service sites CaaS cluster based on the deployment information of the container service instance.

Specifically, the NFVO or the VNFM selects a proper CaaS cluster based on the deployment information, obtained from the VNFD, of the container service instance and locally stored information about each CaaS cluster.

If the deployment information of the container service instance includes a name or an ID of a CaaS cluster, the corresponding cluster is selected. For example, if a label of a CaaS cluster is specified, managed CaaS clusters are traversed to search for the CaaS cluster that includes the corresponding label.

Optionally, if the selected CaaS cluster does not have sufficient resources, and the NFVO or the VNFM has a capability of applying for a CaaS cluster resource from a VIM, the NFVO or the VNFM may apply for a physical server or a virtual machine resource from the VIM, and add the physical server or the virtual machine resource to a CaaS manager of the corresponding CaaS cluster for capacity expansion.

304: The NFVO or the VNFM sends a container service instance creation request to a container as service manager CaaS manager in each of the one or more CaaS clusters.

305: After receiving the request, the CaaS manager in each CaaS cluster performs a container service instance creation (instantiation) operation.

306: Each CaaS cluster sends a container service instance creation success response message to the NFVO or the VNFM.

307: The NFVO or the VNFM locally stores the deployment information of the container service instance, and then directly performs or notifies an EMS to perform initialization configuration on a VNF instance.

308: The NFVO or the VNFM initiates a VNF instantiation success response message to the sender sending the VNF instantiation request message.

Figure 4:
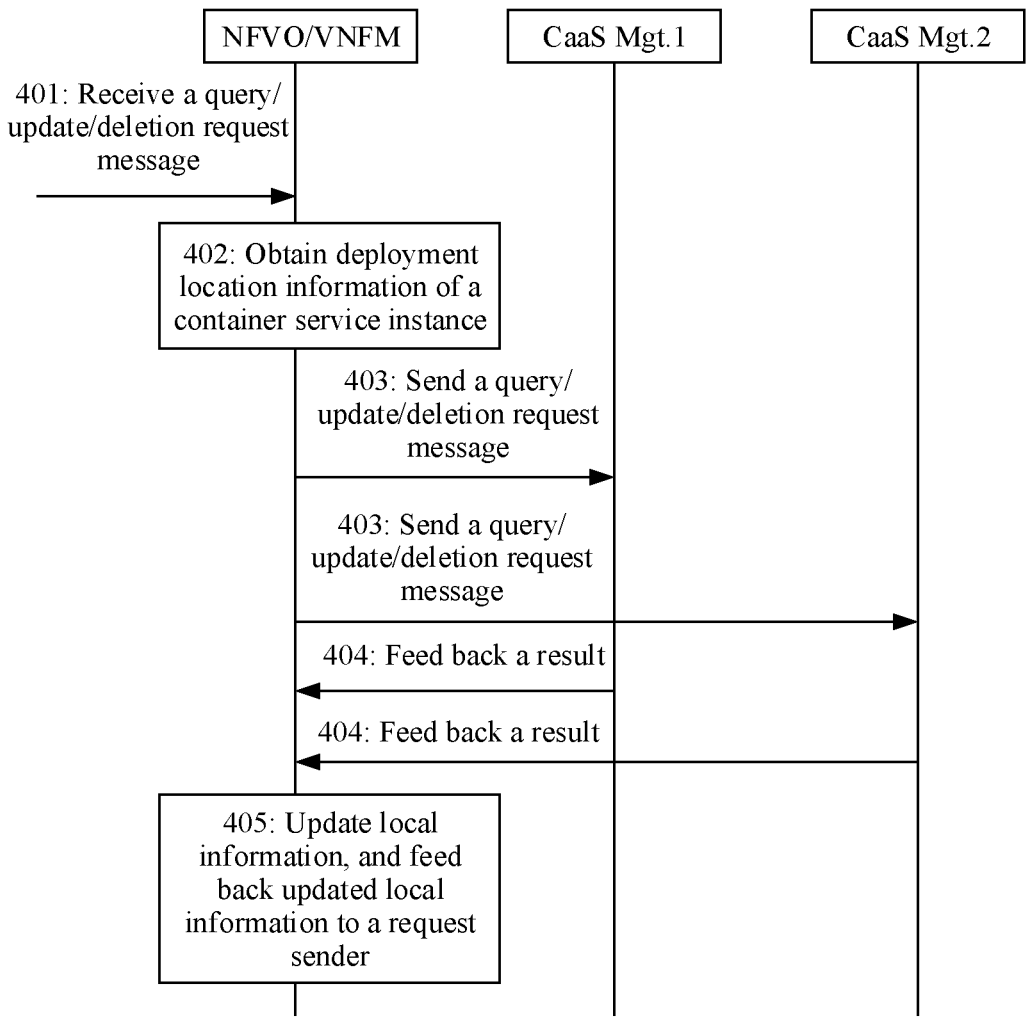
FIG. 4 is a schematic flowchart of querying/updating/deleting container service instances in batches according to an embodiment of the present disclosure.

FIG. 4 is a flowchart of querying/updating/deleting a VNF instance. Specific steps include as follows.

401: A VNFM receives a VNF instance query/update/deletion request message from a sender, where the sender may be an NFVO or an EM; or an NFVO needs to query/update/delete a container service instance of a VNF in a process of processing an NS (Network Service) instantiation request.

402: The NFVO or the VNFM obtains, from locally stored information, deployment location information of the container service instance of the VNF, that is, a CaaS cluster in which the container service instance of the VNF is deployed.

403: The NFVO or the VNFM initiates a container service instance query/update/deletion request to a corresponding CaaS manager.

404: After receiving the request, a CaaS manager in each CaaS cluster performs a corresponding query/update/deletion operation, and feeds back a result to the NFVO or the VNFM.

405: The NFVO or the VNFM updates local information based on feedback information, and feeds back updated local information to the request sender.

Figure 5:
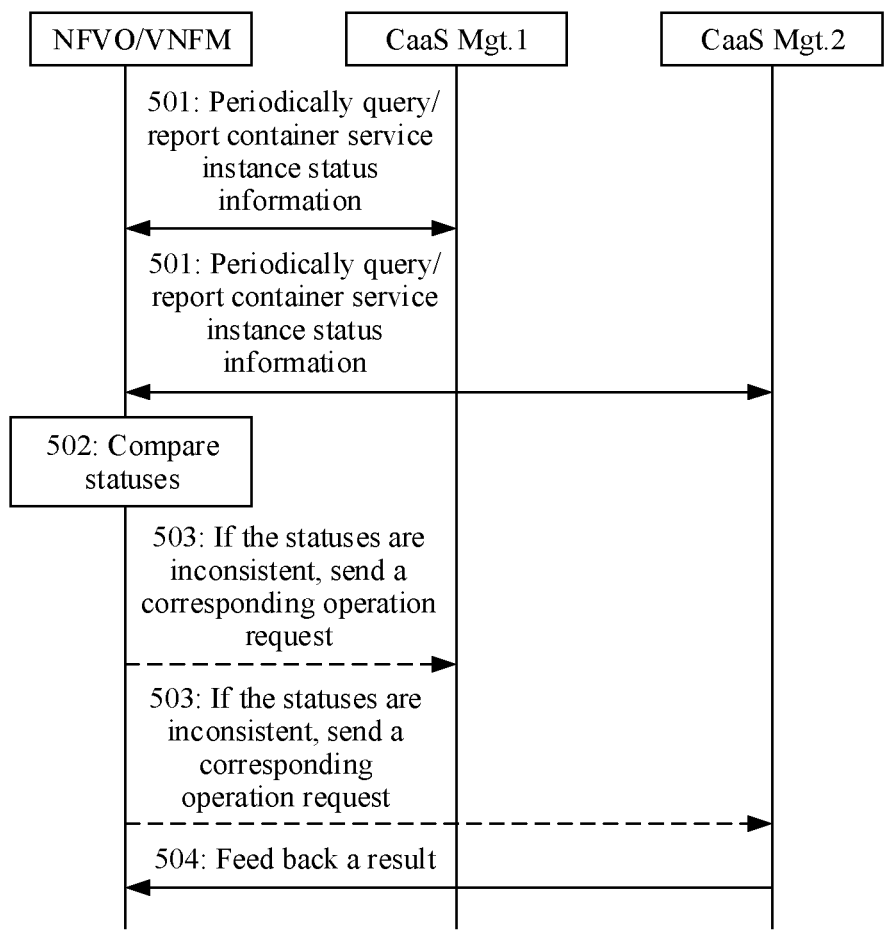
FIG. 5 is a schematic flowchart of maintaining a status of a container service instance according to an embodiment of the present disclosure.

FIG. 5 is a flowchart of maintaining a container service instance of a VNF. Specific steps include as follows.

501: An NFVO or a VNFM periodically queries a status from a CaaS manager in a managed CaaS cluster, or each CaaS manager periodically reports a current container instance status to the NFVO/the VNFM.

502: The NFVO or the VNFM compares the obtained container service instance status with deployment information, described in a VNFD, of a container service instance.

503: If the status is consistent with the deployment information, no processing is performed. If the status is inconsistent with the deployment information, the NFVO or the VNFM initiates a corresponding container instance operation request to the corresponding CaaS manager. For example, if a quantity of actually deployed container service instances in a CaaS cluster is less than a quantity specified in the VNFD, the NFVO or the VNFM needs to initiate a container service instance creation request to the CaaS cluster, so that the quantity of actually deployed container service instances is consistent with a requirement.

If the entire CaaS cluster is abnormal, the NFVO or the VNFM cannot communicate with the corresponding CaaS manager. In this case, the NFVO or the VNFM needs to reselect a proper CaaS cluster based on a container service instance deployment requirement in the VNFD and locally stored CaaS cluster information (This process is similar to the process in FIG. 3), and deploy a container service instance that needs to be hosted by the faulty cluster to the newly selected CaaS cluster, so that an overall deployment result is consistent with the requirement in the VNFD.

504: After the CaaS cluster completes creation of the container service instance, the NFVO or the VNFM receives a feedback result from the CaaS cluster.

The foregoing method embodiments are provided for a scenario of one or more CaaS clusters in a MANO architecture. According to the foregoing method procedures, problems of cross-site deployment and management of a container service in an NFV scenario are resolved, so that a container service of a VNF can be deployed in different CaaS clusters, and a MANO system can control and manage one or more CaaS clusters.

The following further describes a related apparatus or device in the foregoing method embodiments. Details are as follows.

Figure 6:
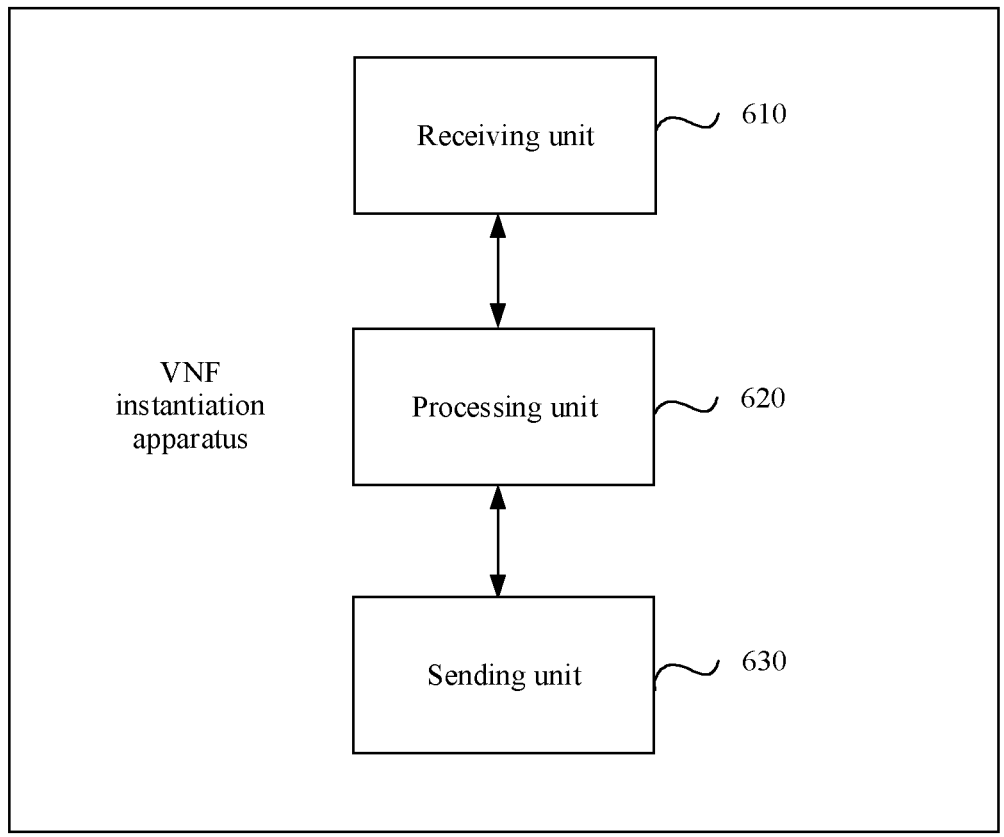
FIG. 6 is a schematic diagram of a VNF instantiation apparatus according to an embodiment of the present disclosure.

FIG. 6 is a schematic diagram of a virtualized network function VNF instantiation apparatus. The apparatus includes:

a receiving unit 610, configured to receive a virtualized network function VNF instantiation request message;

a processing unit 620, configured to: obtain deployment information of a container service instance that needs to be invoked for VNF instantiation, and determine one or more container as service sites CaaS cluster based on the deployment information of the container service instance; and a sending unit 630, configured to send a container service instance creation request to a container as service manager CaaS manager in each of the one or more CaaS clusters; where the receiving unit 610 is further configured to receive a container service instance creation success response message from the CaaS manager.

For specific steps and functions of the foregoing units, refer to the descriptions of the method steps shown in FIG. 3 to FIG. 5. Details are not described herein again.

Figure 7:
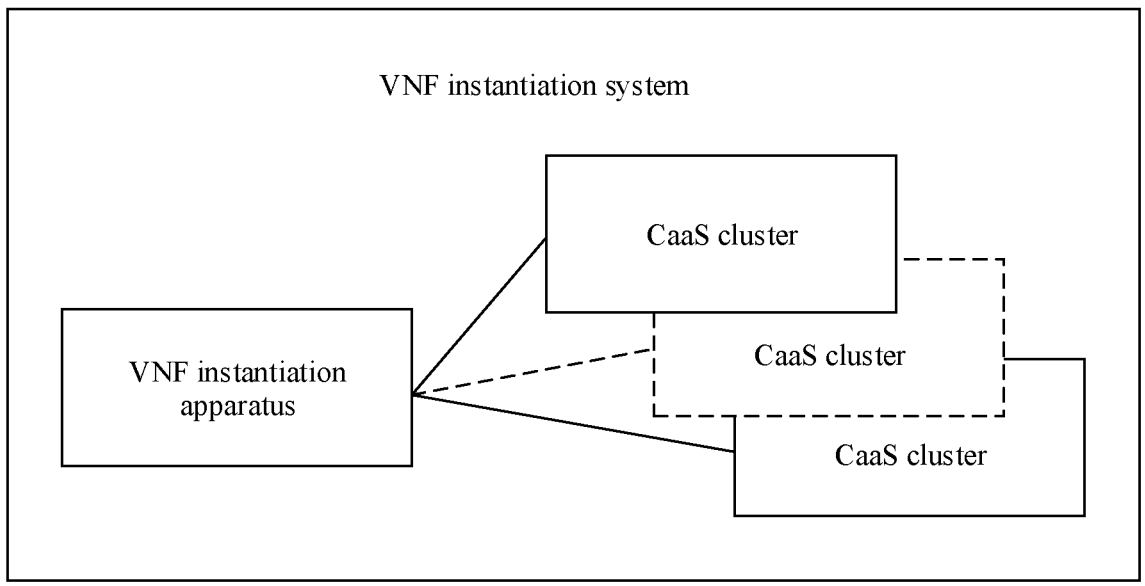
FIG. 7 is a schematic diagram of a VNF instantiation system according to an embodiment of the present disclosure.

FIG. 7 is a schematic diagram of a VNF instantiation system. The system includes:

a VNF instantiation apparatus and one or more CaaS clusters, where the VNF service instantiation apparatus is configured to: receive a VNF instantiation request message; obtain capability information of a container service site CaaS cluster that needs to be invoked for VNF instantiation; determine one or more CaaS clusters based on the capability information of the CaaS cluster, and send a container service instance creation request to a container as service manager CaaS manager in each of the one or more CaaS clusters; and receive a container service instance creation success message from the CaaS manager; and the one or more CaaS managers each are configured to: create a corresponding container service instance based on the capability information of the CaaS cluster, and send the container service instance creation success message to the VNF service instantiation apparatus.

The virtualized network function VNF service instantiation apparatus is a network functions virtualization orchestrator NFVO or a virtualized network function manager VNFM.

For specific steps and functions of the foregoing apparatuses, refer to the descriptions of the method steps in FIG. 3 to FIG. 5. Details are not described herein again.

Figure 8:
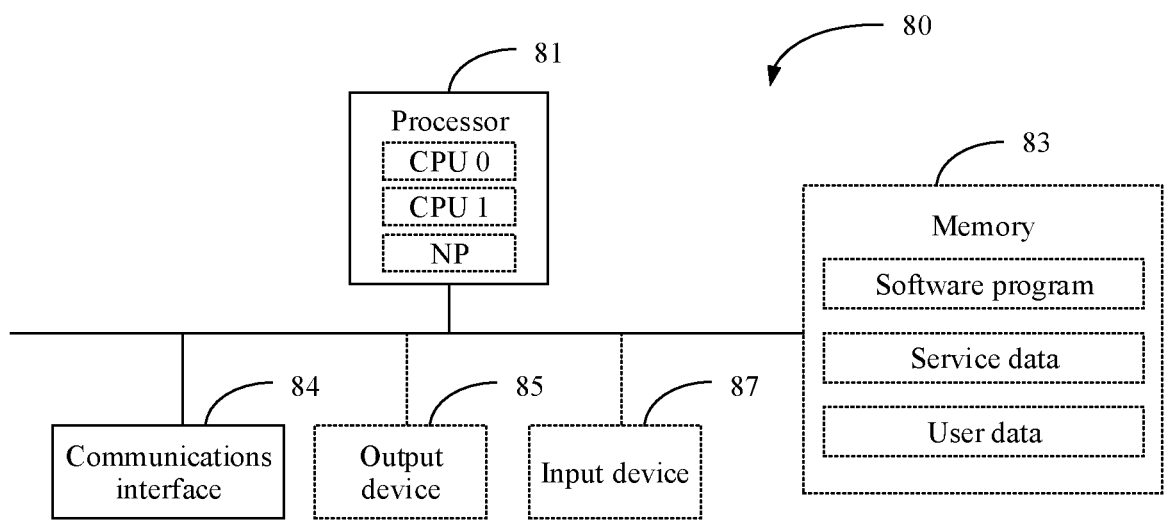
FIG. 8 is a schematic diagram of hardware of a VNF instantiation apparatus according to an embodiment of the present disclosure.

FIG. 8 is a hardware diagram of a VNF instantiation apparatus 80 according to an embodiment of the present disclosure. The apparatus 80 may include a processor 81, a communications interface 84, and a memory 83.

The processor 81 may include one or more processing units. The processing unit may be a central processing unit (English: central processing unit, CPU), a network processor (English: network processor, NP), or the like.

The communications interface 84 is configured to connect to and exchange information with another communications device, including receiving and sending a corresponding message. The network apparatus 80 may further include a memory 83, and the processor 81 may be connected to the memory 83 and the communications interface 84 through a bus. The memory 83 may be configured to store a software program. The software program may be executed by the processor 81, to implement the method steps performed by the VNFM in the embodiment shown in FIG. 3. In addition, the memory 83 may further store various types of service data or user data, including status data of various application instances and services in the foregoing method steps, and the like.

Optionally, the apparatus 80 may further include an output device 85 and an input device 88. The output device 85 and the input device 88 are connected to the processor 81. The output device 85 may be a display configured to display information, a power amplifier device configured to play a sound, a printer, or the like. The output device 85 may further include an output controller, configured to provide an output to the display, the power amplifier device, or the printer. The input device 88 may be a device such as a mouse, a keyboard, an electronic stylus, or a touch panel that is used by a user to input information. The input device 88 may further include an input controller, configured to receive and process an input from a device such as a mouse, a keyboard, an electronic stylus, or a touch panel.

Similarly, the hardware diagram of the foregoing apparatus is also applicable to a CaaS cluster apparatus. A difference lies in that the software program stored in the memory 83 is executed by the processor 81, to implement the method steps performed by the CaaS cluster in the embodiment shown in FIG. 3. This is not repeated herein.

All or a part of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by a computer, or a data storage device, such as a server or a data center, integrating one or more usable mediums. The usable medium may be a magnetic medium (for example, a floppy disk, a hard disk, or a magnetic tape), an optical medium (for example, a digital versatile disc (Digital Versatile Disc, DVD), a semiconductor medium (for example, a solid-state drive (Solid-State Disk, SSD)), or the like.

A person of ordinary skill in the art may understand that all or a part of the steps in the foregoing embodiments may be implemented by hardware or a program instructing related hardware. The program may be stored in a computer-readable storage medium. The storage medium mentioned above may be a read-only memory, a magnetic disk, an optical disc, or the like.

The foregoing descriptions are merely embodiments provided in this application, but are not intended to limit this application. Any modification, equivalent replacement, or improvement made without departing from the principle of this application shall fall within the protection scope of this application.

The invention claimed is:

1. A virtualized network function (VNF) instantiation method performed by a network functions virtualization orchestrator (NFVO) or a virtualized network function manager (VNFM), comprising:
   receiving a virtualized network function (VNF) instantiation request message;
   obtaining deployment information of a container service instance that needs to be invoked for VNF instantiation;
   determining one or more container as service (CaaS) clusters based on the deployment information of the container service instance;
   sending a container service instance creation request to a CaaS manager in each of the one or more CaaS clusters; and
   receiving a container service instance creation success message from the CaaS manager.

2. The method according to claim 1, wherein the obtaining deployment information of a container service instance that needs to be invoked for VNF instantiation comprises:
   obtaining, by the VNFM, a corresponding VNFD from a database based on the VNF instantiation request message; and
   obtaining the deployment information of corresponding container service instance from the VNFD.

3. The method according to claim 1, wherein the deployment information of the container service instance comprises one or more of the following:
   a name of a specified cluster, or
   an affinity/anti-affinity rule, or
   a deployment weight of each CaaS cluster or a quantity or a quota of container service instances that are deployed in each CaaS cluster, when a plurality of container CaaS clusters are deployed.

4. The method according to claim 1, wherein
   if a selected CaaS cluster does not have sufficient resources, a physical server or a virtual machine resource is applied for from a virtualized infrastructure manager VIM, to add a resource to the selected CaaS cluster.

5. The method according to claim 1, further comprising:
   locally storing the deployment information of the container service instance;
   performing initialization configuration on a VNF instance; and
   creating corresponding VNF instance.

6. The method according to claim 5, further comprising:
receiving a VNF query/update/deletion request message;
obtaining, from locally stored information, the one or more CaaS clusters in which a container service instance is deployed;
initiating a container service instance query/update/deletion request to a CaaS manager in a corresponding CaaS cluster; and
after the CaaS manager performs a corresponding container operation, receiving information fed back by the CaaS manager, and updating local information.

7. The method according to claim 1, further comprising:
querying a status from the CaaS manager in the CaaS cluster, or receiving a current container service instance status periodically reported by the CaaS manager;
comparing the obtained container service instance status with deployment information in a VNFD; and
when the status is inconsistent with the deployment information in the VNFD, initiating a corresponding container instance operation request to corresponding CaaS manager.

8. The method according to claim 1, further comprising:
querying a status from the CaaS manager in the CaaS cluster; and
when the CaaS cluster is faulty, reselecting a proper CaaS cluster based on deployment information of the container service instance in a VNFD and/or locally stored deployment information of the container service instance, and deploying, to the newly selected CaaS cluster, the container service instance hosted by the faulty CaaS cluster.

9. A virtualized network function VNF instantiation apparatus, comprising:
an input device, configured to receive a virtualized network function VNF instantiation request message;
one or more processors coupled to the input device, configured to obtain deployment information of a container service instance that needs to be invoked for VNF instantiation, and determine one or more containers as service CaaS clusters based on the deployment information of the container service instance; and
an output device coupled to the one or more processors, configured to send a container service instance creation request to a container as a CaaS manager in each of the one or more CaaS clusters, wherein
the input device is further configured to receive a container service instance creation success message from the CaaS manager.

10. The apparatus according to claim 9, wherein the one or more processors are further configured to:
obtain a corresponding VNFD from a database based on the VNF instantiation request message; and
obtain the deployment information of corresponding container service instance from the VNFD.

11. The apparatus according to claim 9, wherein the deployment information of the container service instance comprises one or more of the following:
a name of a specified cluster, or
an affinity/anti-affinity rule, or
a deployment weight of each CaaS cluster or a quantity or a quota of container service instances that are deployed in each CaaS cluster, when a plurality of container CaaS clusters are deployed.

12. The apparatus according to claim 9, wherein when a selected CaaS cluster does not have sufficient resources, a physical server or a virtual machine resource is applied from a virtualized infrastructure manager VIM to add a resource to the selected CaaS cluster.

13. The apparatus according to claim 9, wherein
the one or more processors are further configured to locally store the deployment information of the container service instance, perform initialization configuration on a VNF instance, and create corresponding VNF instance.

14. A virtualized network function VNF instantiation system, comprising:
a virtualized network function (VNF) service instantiation apparatus; and
one or more containers,
wherein the VNF service instantiation apparatus includes an input device, one or more processors coupled to the input device, and an output device coupled to the one or more processors,
wherein the input device is configured to receive a VNF instantiation request message,
wherein the one or processors are configured to obtain deployment information of a container service instance that needs to be invoked for VNF instantiation, and determine one or more CaaS clusters based on the deployment information of the container service instance,
wherein the output device is configured to send a container service instance creation request to one of the one or more containers as a CaaS manager in each of the one or more CaaS clusters,
wherein the input device is further configured to receive a container service instance creation success message from the CaaS manager, and wherein the CaaS manager is configured to:
receive the container service instance creation request;
create a corresponding container service instance; and
send the container service instance creation success message to the VNF service instantiation apparatus.

15. The system according to claim 14, wherein the obtaining deployment information of a container service instance comprises:
obtain a corresponding VNFD from a database based on the VNF instantiation request message; and
obtain the deployment information of corresponding container service instance from the VNFD.

16. The system according to claim 14, wherein the deployment information of the container service instance comprises one or more of the following:
a name of a specified cluster, or
an affinity/anti-affinity rule, or
a deployment weight of each CaaS cluster or a quantity or a quota of container service instances that are deployed in each CaaS cluster, when a plurality of container CaaS clusters are deployed.

17. The system according to claim 14, wherein when a selected CaaS cluster does not have sufficient resources, a physical server or a virtual machine resource is applied from a virtualized infrastructure manager VIM to add a resource to the selected CaaS cluster.

18. The system according to claim 14, wherein the VNF service instantiation apparatus is further configured to locally store the deployment information of the container service instance, perform initialization configuration on a VNF instance, and create the corresponding VNF instance.

19. A virtualized network function VNF service instantiation apparatus, comprising:
a processor; and
a memory coupled to the processor, wherein the memory is configured to store a program; and the processor is configured to execute the program stored in the memory to:

receive a virtualized network function (VNF) instantiation request message;

obtain deployment information of a container service instance that needs to be invoked for VNF instantiation;

determine one or more container as service (CaaS) clusters based on the deployment information of the container service instance;

send a container service instance creation request to a CaaS manager in each of the one or more CaaS clusters; and receive a container service instance creation success message from the CaaS manager.

20. A non-transitory computer-readable medium storing computer instructions, that when executed by one or more processors, cause the one or more processors to perform the steps of:

receiving a virtualized network function (VNF) instantiation request message;

obtaining deployment information of a container service instance that needs to be invoked for VNF instantiation;

determining one or more container as service (CaaS) clusters based on the deployment information of the container service instance;

sending a container service instance creation request to a CaaS manager in each of the one or more CaaS clusters; and receiving a container service instance creation success message from the CaaS manager.

* * * * *